INVENTORS
STANLEY H. HUNKINS &
GEORGE W. HERNAN
BY Millman and Jacobs
ATTORNEYS

INVENTORS
STANLEY H. HUNKINS &
GEORGE W. HERNAN
BY Millman and Jacobs
ATTORNEYS

INVENTORS
STANLEY H. HUNKINS &
GEORGE W. HERNAN
BY Millman and Jacobs
ATTORNEYS

INVENTORS
STANLEY H. HUNKINS &
GEORGE W. HERNAN
BY Millman and Jacobs
ATTORNEYS

INVENTORS
STANLEY H. HUNKINS &
GEORGE W. HERNAN
BY Millman and Jacobs
ATTORNEYS

United States Patent Office 3,349,328
Patented Oct. 24, 1967

3,349,328
DIGITAL COMMUNICATION SYSTEM USING HALF-CYCLE SIGNALS AT BIT TRANSITIONS

Stanley H. Hunkins, Cherry Hill, and George W. Hernan, Haddonfield, N.J., assignors to Ultronic Systems Corp., a corporation of Delaware Filed Dec. 30, 1963, Ser. No. 334,129
3 Claims. (Cl. 325—38)

ABSTRACT OF THE DISCLOSURE

Transitions from 0-bits to 1-bits, and vice versa, are transmitted as half-cycle signals of bit period length with opposite polarities for opposite transition directions. Advantageously, 0-bits and 1-bits are converted to full-cycle signals of bit period length and of opposite phase for opposite types of bits, yielding said half-cycle signals at bit transitions. At the receiver the half-cycle signals control the signal level of the reconstructed binary signal. The full-cycle signals may be used to produce output bit signals, with level control by the half-cycle signals.

This invention relates to signaling and communication systems and may be used for the transmission of digital signals.

In current digital communications systems, it is the practice to handle digital data by methods and means employing a modulated carrier wave; such systems include those of amplitude and frequency modulation and frequency shift keying. In such systems, the digital data to be transmitted is used to generate a modulation signal that is then employed to modulate a carrier signal. The modulated carrier is employed to drive a signal transmission channel; and at the remote or receiving terminal of the channel, the signal is demodulated to obtain the modulation portion thereof, and the latter is decoded to recover the original digital data.

In such systems, the steps and apparatus involved in the carrier generation, the modulation of the carrier, and the demodulation have to be added to data handling systems for purposes of the transmission of the data. Moreover, the signal channel over which the data is transmitted generally has a limited usable bandwidth, and the carrier frequency is generally chosen to be within that bandpass. The modulation frequency is necessarily substantially less than the carrier frequency, and it is the modulation that carries the digital information to be transmitted. Consequently, a substantial portion of the channel bandwidth and the higher frequencies thereof are generally not used to transmit the data itself.

Accordingly, it is an object of this invention to provide a new and improved digital signaling and communications system.

Another object is to provide new and improved digital communication apparatus that is adapted for use with existing digital and communications equipment.

Another object is to provide a new and improved method and apparatus for transmitting digital information in a signal transmission channel with improved utilization of the signal bandwith of the channel.

Another object is to provide a new and improved digital transmitting and receiving apparatus.

Another object is to provide new and improved digital communication apparatus that is adapted for use with existing digital and communications equipment.

In accordance with an embodiment of this invention, serial binary information signals are transmitted by developing from the binary signals a train of signals that are of alternatingly opposite-going directions from a reference level, and each of the signals represents a transition of the information from one binary type to the other. The train of signals is transmitted through a signal transmission channel to a receiver where binary signals are developed therefrom by generating one and another type of signal upon the occurrence respectively of successive opposite-going signals. This system is effective to transmit digital signals in a communications channel having limited bandwith due to substantial and variable attenuation and delay distortion and substantial noise. Moreover, the binary information can be transmitted in effect at various rates up to a rate that roughly corresponds to twice the upper cutoff frequency of the communications channel. Other approaches are used in different forms of the invention.

The foregoing and other objects of this invention, the features thereof as well as the invention itself, may be more fully understood from the following description when read together with the accompanying drawing, in which.

In the drawing corresponding parts are referenced throughout by similar numerals.

Figure 1:
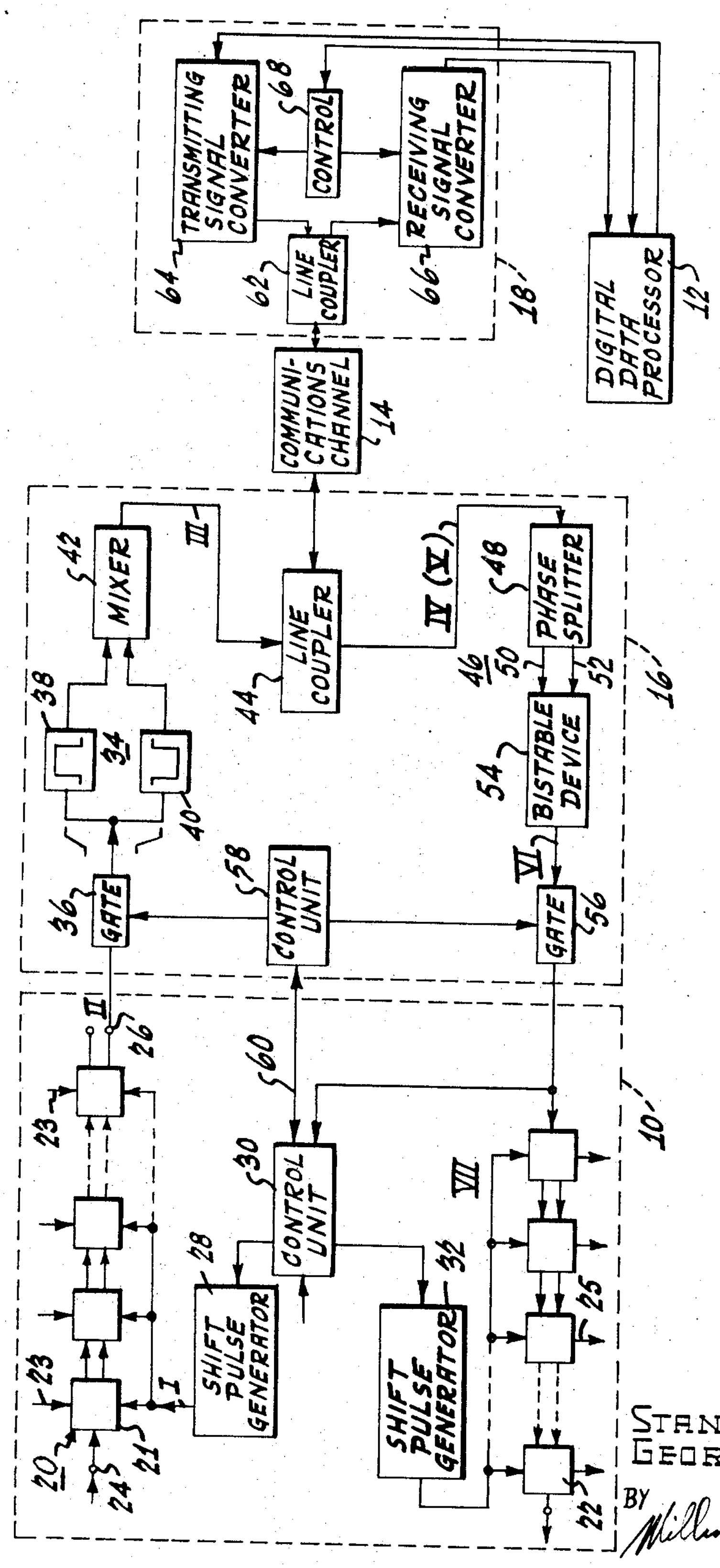
FIG. 1 is a schematic block diagram of a digital signaling and communications system and apparatus embodying this invention.

In the system of FIG. 1, digital information signals are transmitted between two data processor equipments 10 and 12 via a communications channel 14 and data sets 16 and 18 individually associated with the equipments 10 and 12, respectively. The data processor equipments 10 and 12 may be any suitable source and processor of digital signals, such as signals in a binary form. The terminal equipment of the data processor includes, by way of example, separate registers 20 and 22 for respectively storing messages to be transmitted and messages that are received via the communications line. These registers 20 and 22 in fact may be but a single register in some types of terminal equipment with a control apparatus provided for determining which operating mode the register assumes at any particular time of operation.

In the example shown in FIG. 1 the registers 20 and 22 are formed of a plurality of storage stages 21 connected to form a shift register. One common form of such shift register is that of a plurality of bistable stages, such as flip-flops, connected in series with the signals being supplied serially to the terminal 24 of an input stage at one end of the series and reproduced serially at an output terminal 26 at the other end thereof. Alternatively, the signals may be introduced in parallel via inputs 23 or extracted in parallel via outputs 25.

The shifting of signals along the shift register 20 is under the control of shift pulses supplied by a shift pulse generator 28 that is operated by a control unit 30 to initiate the generation of a series of shift pulses (line I of FIG. 2) occurring at a regular repetition rate. In a similar fashion, the register 22 is actuated by a shift pulse generator 32 operated by the control unit 30. With flip-flop stages 21 (or by adding such a stage as the output of any other type of binary signal source), the signals produced at the output terminal 26 are conveniently in the form of negative and positive levels (line II, FIG. 2) that represent, in accordance with a set of standards followed in the industry, binary digits 1 and 0, respectively, and correspond to "mark" and "space" signal conditions. These levels may, of course, be used to represent the opposite respective digits, if desired.

The data set 16 includes a transmitting signal converter 34 that receives the signal levels via a control gate 36. The electrical signal levels for convenience may be considered as voltage or current levels depending on the types of circuits used; for example, electron tubes, transistors or electromechanical relays. The converter 34 includes two signal generators 38 and 40 which are respectively responsive to positive-going and negative-going steps in the signal levels to produce positive and negative signal pulses or half-cycles. One appropriate type of signal generator is a one-shot or monostable multivibrator that produces a pulse of a certain duration and in a direction from a reference level corresponding to the input signal step. The outputs of the circuits 38 and 40 are combined in a buffer circuit or mixer 42 and supplied to a line coupler 44, such as a transformer; thereby, the latter drives the channel 14 with a signal train of positive and negative signal half-cycles (line III, FIG. 2) that alternate in polarity successively and that vary from a common reference signal level.

The duration of each signal half-cycle should not be less than one-half of the cycle period of the maximum usable bandpass frequency; and for the highest data transmission rate it should be equal to one-half the cycle period of that frequency. Preferably, the bit period (the period of the shift pulse cycles) of the binary information should be equal to the duration of the signal half-cycles from generators 38, 40, so that an optimum data transmission rate is attained. Where the bit period is longer than the duration of the signal half-cycle (the relationship shown in line III, FIG. 2), the data rate is lower than optimum. Generally, the bit period should not be shorter, so as to avoid non-uniform timing of the signal half-cycles. Accordingly, each signal pulse or half-cycle starts from the reference level. Thereby, a signal system coherent at the reference level and having a good signal-to-noise ratio is established; the coherent character of the system is important in producing generally uniform signals and timing in the transmitted signal train.

The data set 16 also includes a receiving signal converter 46 that receives signals from the line coupler 44 supplied by the channel 14 when transmitting in the opposite direction. For this purpose a separate transformer may be provided in the line coupler (or a single transformer may be used for both transmitting and receiving with appropriate decoupling controls provided).

The signal from the coupler 44 is applied to a phase splitter 48 which supplies the received signal train on one output line 50 as well as the inverted form of that signal train on another output line 52, both of which lines are connected as inputs to a bistable device 54. The bistable device 54 is a binary counter stage or preferably a flip-flop circuit that is driven to opposite states by pulses (say, positive pulses) appearing alternatingly on the lines 50 and 52. Thus, the flip-flop is set by the positive pulses of the transmitted signal train and reset by the negative pulses thereof. The signal generated at the output of the bistable device 54 (line VI, FIG. 2) is essentially a reproduction of the original binary waveform. That is, the device 54 is in its reset condition and generates a signal level corresponding to a marking signal until the first positive pulse of the received signal train (line IV, FIG. 2), which pulse produces a transition to the set condition and the other signal output level. This continues until the next negative pulse resets the device and produces the marking output level, and so on. The output levels are supplied via a gate 56 to the input terminal of the register 22, along which the successive bits are shifted under the control of the shift pulses which are generated at the same rate as those from generator 28. The data signals supplied to the register 22 are preferably supplied to the control unit 30 in order to synchronize the generation of the shift pulses from generator 32 (line VII, FIG. 2) to occur successively in appropriate time relationship to the data signals.

The gates 36 and 56 are operated with one open and the other closed by a control unit 58 depending on whether the data set 16 is in the receiving or transmitting mode. The control unit 30 of the terminal equipment in the data processor 10 is connected by control lines 60 to the control unit 58 of the data set 16. These control lines 60 are customarily provided for the control 30 to send a "request-to-send" signal to the control 58 whenever information is in the register 20 ready for transmission or when it is being transmitted. The control 58, when it receives this request signal and is in condition to accept the data for transmission, opens the gate 36 and returns a "clear-to-send" signal to control 30 to initiate the generation of shift pulses and the transmission of the serial line of binary signals out via terminal 26 to the then-opened gate 36. When the information has been transmitted from register 20, the control 30 sends a signal to control 58, indicating that it is then ready to receive data, and the control 58 closes gate 36 and opens gate 56.

The data set 18 is generally similar to data set 16, and the details are omitted for simplicity of illustration. It includes a line coupler 62 that receives signals from a transmitting signal converter 64 or alternatively supplies signals to the receiving signal converter 66. A control 68 operates in a fashion similar to the control 58 to supervise the alternative transmitting or receiving operation and to accept the information to be transmitted from the data processor 12 or to supply the latter with information received from the communications channel 14.

Figure 2:
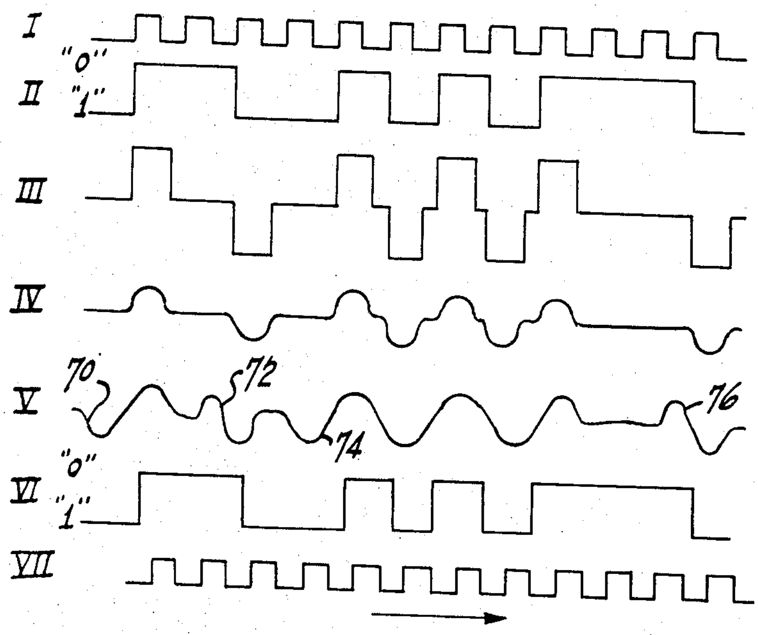
FIG. 2 is an idealized graphical diagram of the relative time occurrences and amplitude directions of waveforms occurring in the referenced parts of the system of FIG. 1 in a time sequence indicated by an arrow.

The operation of the data sets 16 and 18 may be more fully appreciated from a consideration of the waveforms in FIG. 2. Assuming that the transmitting converter 64 is supplying the signal train in line III, the signal train produced at the output of the communications channel and supplied to the phase splitter 48 via the transformer coupler 44 can be expected to be in a distorted form, such as that shown in line V, and to include spurious pulses (for example, pulses 70, 72, 74, 76) in addition to the half-cycle signals generated by the transmitting converter 64.

The receiving converter 46 is effective to discriminate between the correct information signals and the spurious ones generated within the communications channel 14 by the use of a flip-flop having set and reset inputs connected to lines 50 and 52. The phase splitter 48 steers the positive-going pulses to the line 50 to set the bistable device 54, while the negative-going pulses are inverted and steered to the line 52 to reset the device 54. Normally, a message terminates with a marking signal so that the bistable device 54 is left in a reset condition. Accordingly, any negative pulses produced thereafter have no effect on the flip-flop device 54, and it remains in that reset condition. For this reason, the initial negative-going pulse 70, which is a spurious pulse that is initially generated, it has been found, prior to the first positive-going pulse, has no effect on the flip-flop device 54 and no effect on the output signal thereof. The first positive-going pulse sets the device 54 to reverse the output voltage level thereof. This condition of the flip-flop device continues and is not affected by any extraneous positive-going pulses 72 that follow thereafter. The next negative-going pulse resets the bistable device, which again reverses the output waveform, and the operation continues in this fashion with successive pulses. Accordingly, the waveform supplied to the input register 22 of one data processor 10 is a duplicate of the waveform obtained from the output register 20 of the other data processor 12.

As a consequence of the transmitted signal waveform being a continuous wave of signals alternating in polarity from a reference, the receiving converter 46 is effective to reject spurious noise pulses occurring in the "wrong" direction. With this system it has been found possible to more effectively use the limited bandwidth of a communications channel for the transmission of digital data.

Figure 3:
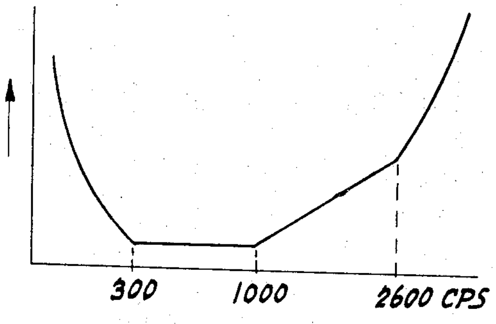
FIG. 3 is an idealized graphical diagram of a typical attenuation characteristic of one communications channel with which this invention is used.

In the example of the communications channel, graphically illustrated in FIG. 3, which represents an average of long distance telephone channels for voice frequencies, it has been found possible to transmit signals effectively to duplicate a binary signal waveform involving an equivalent binary bit rate of 5,000 or more bits per second although the usable bandwidth between the upper and lower roll-off or frequencies is only of the order of 2,400 cycles per second between 300 and 2,700 c.p.s. The lower roll-off is about 10–25 db per octave, and the upper roll-off, about 80–90 db. In designing data sets and selecting suitable data transmission rates for a particular channel, the attenuation and delay distortions of the signals are considered to vary between two cutoff frequencies at which signal frequency components are so severely attenuated by the channel as to be relatively insignificant, and for practical purposes unusable. The criterion for such cutoff frequencies (i.e. the minimum and maximum usable frequencies) generally varies with what is practical for the receiver gain and distortion equalization or compensation.

The highest frequency that has to be transmitted is that corresponding to a binary information series of 101010, for which a full signal cycle is transmitted corresponding to two successive half-cycles of opposite polarity for each binary pair of 1 and 0. In principle, the highest effective binary information rate that can be transmitted roughly corresponds to twice the upper cutoff frequency of the communications channel. Stated otherwise, the maximum frequency response required of the communications channel 14 is roughly half the maximum equivalent binary information rate; this rate is a consequence of the maximum fundamental frequency of the transmitted signals (corresponding to the transitions of the binary information) being one-half of the rate of the binary data rate that is supplied and effectively transmitted.

Another consequence of using the alternating positive and negative form of transmission signal has been found; namely, that this signal train results in less distortion of the transmitted waveform. It is not entirely clear what the reasons for this are; though it has been found that if a corresponding series of pulses that are successively of the same polarity are sent down the line, the ultimate waveform that is produced cannot be interpreted with respect to any reference, and successive pulses may merge as a single pulse. However, with the alternating waveform generated in accordance with this invention, the pulses are always coherently related to a reference, and the departures from the reference correspond to information except when such departures do not meet the requirement that they be alternating in polarity.

The transmission of successive pulses of the same polarity is also not as efficient as the system of this invention in which successive alternating polarities are transmitted, in that two successive pulses of the same polarity may be received as one and a half cycles, while alternating pulses are but one cycle, and therefore result in a substantially higher data rate. It has been convenient to consider the effect of successive pulses of the same polarity as that of producing a net direct voltage component with respect to the reference of the transmission channel. The alternate positive and negative half-cycles may be considered as successively charging and discharging the reactances of the channel about its reference with little or no net distorting direct voltage component.

A communications channel such as a telephone network is designed to accommodate speech frequencies and not the ordinary data signal spectrum of a digital type. Amplitude distortion and delay distortion have substantial effects on the signals, though equal distortion over the frequency spectrum of either type can generally be accommodated. Distortion, however, which is unequal over the frequency band can make the ordinary binary signal train effectively unintelligible or uninterpretable. It has been found that the alternating polarity signal transmitted with the system of this invention through a channel of limited bandwidth remains effectively one that can be reconstructed and interpreted to restore the original waveform of binary information signals.

The invention is not limited in its application to any particular type of digital data processor, and any desired source of binary signals is appropriate to operate the data sets 16 and 18. A suitable data processing system is described in copending patent application, Ser. No. 149,913, now Patent No. 3,281,788, which also describes suitable circuits that can be used for certain ones of the blocks described herein. Where the binary signals at the source are not in the form of voltage levels in the manner described, suitable circuits are provided to convert the binary signals to such levels for use directly with the data sets 16 and 18. Moreover, other forms of data sets may be provided as is described hereinafter which operate directly with a desired type of binary signal. It is not necessary that the signals be derived from and sent to shift registers in the data processor, though this is one simple and appropriate form of input and output therefor, and any other type of storage register or any appropriate type of digital data processor may be used directly.

The shift pulse generators 28 and 32 may take any appropriate form, suitable ones of which are well known in the art and include freely running oscillators and pulse-former circuits. The control unit 30 includes, for example, a flip-flop for operating the generators 28 and 32 alternatively together with appropriate other flip-flops for supplying the control signals on the lines 60 together with appropriate digital logic for performing the control operations. The details of this construction do not form a part of this invention, and a suitable form of control unit for this purpose may be readily devised by those skilled in the art for any particular type of data processor terminal equipment. Similarly, the control unit 58 or 68 in the data sets may be considered as including a flip-flop for alternatively operating the gates 36 and 56 together with appropriate other digital logic and flip-flops for performing the control operations and supplying the control signals on the lines 60. Various types of gates may be used for the gates 36 and 56, such as diode gates, and these gates may be readily designed to provide a suitable output voltage for a standby condition when the gate is open or closed. Moreover, the gates 36 and 56 may be replaced by other appropriate decoupling controls within the signal converting circuits 34 and 46. For example, the control unit may operate the individual transformers of the line couplers to clamp one while the other is operating. The control unit may be used to open a signal path in any other part of one converter while the other converter is operating, and vice-versa; moreover, gates or other switching circuits may be used as such decoupling circuits at any suitable point in each converter. If the data terminal equipments 10 and 12 are compatible with EIA standards RS–232–A, 1963, gates 36 and 56 and control unit 58 are not needed.

The pulse or half-cycle generating circuits 38 and 40 in the transmitting converter 34 are not limited to any particular type nor to any particular waveform. In addition to square wave generators, such as one-shot multivibrators, waveforms of any other desired shape (for example, a triangular waveshape) may be generated to produce the equivalent of a half-cycle signal. Such waveshapes contain frequency components higher than the passband of the communications channel 14 which effectively filters out such frequencies. In order to avoid interference with adjacent channels that might be effectively cross-coupled to pass such frequencies, it is generally desirable to provide a filter circuit within the converter 34 to eliminate frequencies beyond the passband of the communications channel. Preferably, to minimize waveshape distortion and noise generation within the channel 14, the half-cycle generators 38 and 40 are of the type to form half-cycles approximating a sine wave at the highest frequency suitable for the communications channel. For this purpose, an inductance-capacitance oscillating network is useful to generate the sine wave together with a suitable damping circuit, such as a resistor or a diode clamp to limit the oscillation to a half-cycle. For example, a series capacitor, inductor resistor network oscillates when the capacitor is driven by a signal step of either direction. The voltage developed across the resistor is the desired sine wave, and it is effectively limited to a half-cycle by a choice of resistor that dampens the amplitude of the second and subsequent half-cycles to one-tenth or less of the first.

In principle, but a single circuit is needed to obtain the opposite-going pulses from the opposite-going voltage steps supplied as inputs; such a circuit may simply be a differentiating or damped oscillating circuit that produces a pulse or sine wave half-cycle that is consistent in direction to the voltage step supplied thereto. With such a circuit, appropriate amplification is provided for each polarity of pulse or half-cycle to drive the line coupler 44. The limitations of practical available circuits generally require that separate circuits be used for the two polarities.

The mixer 42 may be any suitable circuit acting as a buffer to pass the waveshapes of either polarity, maintain the reference level therefor, and drive the line coupler 44. In one suitable circuit a resistor adder is used. The line coupler 44 preferably is a transformer to meet communication industry requirements. However, any appropriate line coupler may be used. The data sets 16 and 18 may be identical in construction for convenience in manufacture; however, there is no restriction except in the signal parameters that are produced requiring the same construction in the two data sets. The apparatus of FIG. 1 is adapted for half-duplex operation with a single communication channel. For duplex operation with two channels, the same data sets are used, though the same controls are not needed. For one-way transmission, the two data sets need only include a transmitting converter and a receiving converter, respectively.

In choosing the time constant for the circuit employed in the generators 38 and 40, adequate engineering tolerances are provided to ensure compatibility with a range of communication channel characteristics that occur and with which the data sets are to be used. Where binary information is being transmitted, the information sampling rates of the transmitting and receiving portions of the two processors or information sources 10 and 12 are the same in order to ensure proper interpretation of the signal at the receiving processor. However, this invention is not limited to the transmission of information signals and may also be used for the transmission of real time control signals. In the latter case, the waveforms supplied to the data set at one end of the communications channel are reproduced at the other end in the manner described. Where the supplied signal steps represent control signals, corresponding signals are generated at the receiving end to perform the required control operation.

In this situation, the only synchronization between transmitter and receiver is that provided by the control signals themselves. No prescribed repetition rate of the signals is involved since they have no combinatorial informational characteristic.

This invention may also be used to transmit information by varying proportionally the durations of the reference level intervals between pulses of alternating polarity. These reference level durations represent information on an analog basis.

Figure 4:
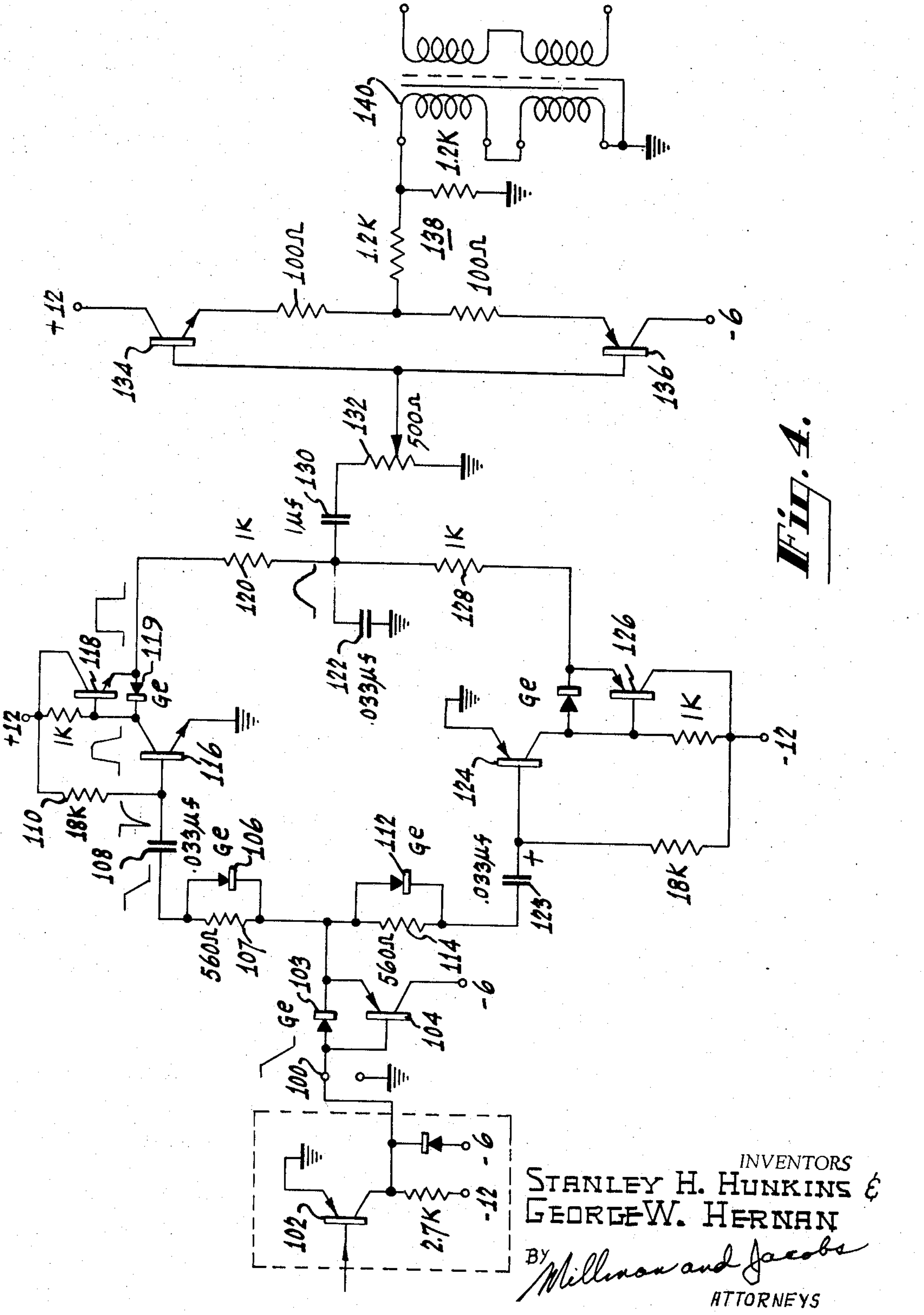
FIG. 4 is a schematic circuit diagram of a transmitting digital signal converter embodying this invention which may be used in the system of FIG. 1.

In FIG. 4 a schematic circuit diagram of a suitable transmitting signal converter circuit is shown that may be used in the system of FIG. 1. The input terminal 100 receives binary input signals in the form of signal levels that (for the particular circuit parameters set forth by way of illustration) swing between zero and −6 volts to represent, for example, the binary digits 1 and 0, respectively. By way of example, the input signals may be derived from a transistor amplifier switch 102 whose collector voltage swings between these levels when the transistor 102 is respectively conducting and non-conducting; such a switch 102 may be one-half of a flip-flop in practice and may function as an adapter to receive larger or different voltage swings.

When the voltage at input terminal 100 goes negative, the diode 103 between the base and emitter of input transistor 104 is cut off, and the transistor conducts. Current is drawn, via the upper path, through the low forward resistance of diode 106, which bypasses resistor 107, and the step change is differentiated by capacitor 108. The emitter current in transistor 104 sees the high back impedance of lower path diode 112, and the substantial impedance of parallel resistor 114 effectively limits the charging current of capacitor 123 in the lower path circuit.

Pulse-forming transistors 116 and 118 are respectively normally on and off. Transistor 116 is turned off by the negative-going voltage step passed by capacitor 108, and the positive-going voltage step at its collector is effective to turn on transistor 118, operating as an emitter-follower, to produce a positive-going pulse with a sharp leading edge. This pulse lasts for a period determined by the time constant of the R-C network 108, 110, assuming that the latter is effectively less than the information bit period. Accordingly, a square pulse of substantial duration is produced, and as the input capacitor 108 discharges, transistor 116 starts to turn back on. Ultimately, emitter follower 118 turns off, and conduction through diode 119 and transistor 116 establishes a sharp trailing edge to the pulse. This square pulse is supplied via an adding resistor 120 to a capacitor 122 which charges up to provide a generally rounded pulse shape that approximates a sine wave. Thereby, undesired high frequency components are effectively filtered out.

In a similar fashion, a positive-going step in voltage at the input terminal 100 turns off the input transistor 104. This positive-going step passes via the input diode 103, the lower path diode 112 and capacitor 123, and is turned into a negative-going pulse by the pulse-forming transistors 124 and 126 arranged in a similar circuit configuration, but with P-N-P transistors for positive-going input voltages. This negative pulse is passed by adder resistor 128 to capacitor 122. The resistor network 120, 128 accepts either the positive-going pulse or the negative-going pulse, and this pulse is passed by a coupling capacitor 130 to an attenuating potentiometer 132 which is adjusted to provide the appropriate amplitude of drive for the communications channel 14.

The drive is performed by a pair of emitter follower circuits 134, 136 whose bases are connected together and whose emitters are connected together to a line terminating resistor network 138 of the channel's characteristic impedance. The positive-going pulse passes via the upper transistor 134 to drive the output transformer primary 140; and a negative pulse is passed by the lower emitter follower 136 in a similar fashion. Thereby, the line is driven alternately, positively and negatively with a one-half cycle pulse that varies in polarity depending upon the original data signals changing from one level to the other, and back; e.g. from a 1 to a zero or back from a zero to a 1. In the absence of such a transition, there is no drive supplied to the transformer primary which has both terminals effectively returned to ground through the channel characteristic impedance. Thus, the circuit accepts signals representing binary data in the form of voltage levels and generates for the communication channel signals that are alternately positive and negative-going as the input levels shift positively and negatively. The pulse durations for the particular illustrated parameters provide a signal frequency of about 2,000 c.p.s. corresponding to a bit rate of 4,000 bits per second.

Figure 5:
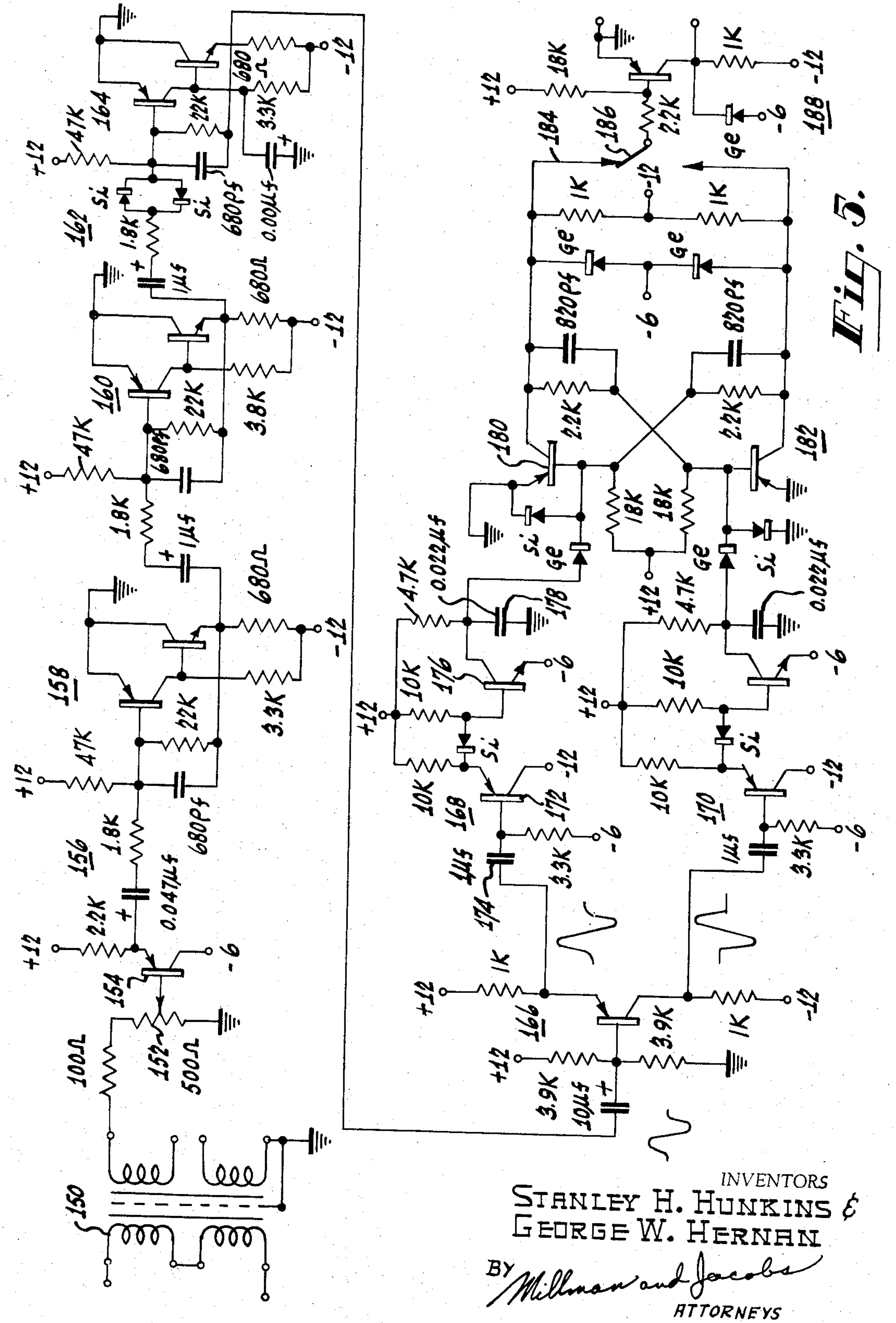
FIG. 5 is a schematic circuit diagram of a receiving digital signal converter embodying this invention which may be used in the system of FIG. 1.

The receiving signal converter of FIG. 5 includes an input transformer 150, the primary of which receives the signals from the line, and the secondary is terminated in its channel characteristic impedance by a network that includes an adjustable attenuator 152. The adjusted level of the input signal is taken off on a tap of the attenuator and supplied via an emitter follower 154 to an attenuation equalizer 156 consisting of a series R-C combination that furnishes a compromise equalization of the attenuations that variably occur in channel 14. The attenuation equalizer is designed to compensate approximately a 4.5 db variation from 1,000 to 2,600 c.p.s. for the characteristic of FIG. 3. A more elaborate equalizer can also be designed to equalize particular delay distortions produced by channel 14 over the effective passband.

Following the equalizer are two stages 158, 160 of amplification to provide substantial gain. The next stage of the receiver is a device 162 for base line slicing together with an amplifier stage 164. This circuit includes two oppositely poled diodes in parallel with the combination connected in series in the signal path. Thereby, signals of less than a certain fraction of a volt (the internal bias of the diode) are rejected to eliminate fluctuations of low amplitude about the base reference level that would tend to present spurious information.

The output of the amplifier 164 is supplied to a phase splitter 166 which generates the signals of opposite-going phases with uniform delay on respectively two signal paths 168, 170. The two paths include ramp and threshold circuits which are the same in form, with each responding to the negative-going waveform in the respective path. In this circuit 168 an emitter follower 172, in response to the negative half-cycles passed by capacitor 174, turns off a transistor switch 176 to permit charging of an output ramp capacitor 178. The charging of the capacitor 178 is long enough to eliminate narrow spikes that may occur on the line due to noise and other uncontrollable conditions. When the capacitor charges up above ground sufficiently, it overcomes the internal threshold of the Ge input diode and turns off transistor 180 of a bistable multivibrator or flip-flop 182. The lower path circuit 170 operates in a similar fashion with the original negative pulses to drive the other transistor of flip-flop 182. Thus, alternate half-cycles set and reset the flip-flop 182 to produce a train of levels at one output 184 thereof which represent the original binary information.

The switch 186 at the output permits one to choose either phase of the flip-flop output. It has been found desirable to provide such a switch to reinvert the signal when the signals are inverted in the channel. A squaring amplifier 188 is provided as the final output circuit for isolation from the load.

In the circuits of FIGS. 4 and 5, the NPN transistors are type 2N10302, the PNP are 2N404, the Ge and Si diodes are any suitable germanium and silicon diodes, respectively. The particular parameters of these circuits are presented merely to illustrate one form of the invention that has been found suitable for a particular communications channel such as one having a characteristic of the type of FIG. 3. That is, the characteristic of FIG. 3 illustrates graphically the attenuation in decibels as a function of frequency. This characteristic has a cutoff at the low end of the passband (below about 300 c.p.s.), a flat loss section (up to about 1,000 c.p.s.), a linear rise section (up to about 2,700 c.p.s.), and a cutoff section at the high end of the passband. One such communications channel is known as a long distance telephone line, either short- or long-haul. Such lines customarily vary in parameters, and the characteristic of FIG. 3 is representative of the average relative attenuation relationships over the passband. The graphical discontinuity points vary with the length of the channel and other characteristics thereof. The noise level is typically below −36 db m., and the channel attenuation can be expected to be about 15 db m. Sufficient gain and noise slicing is provided in the receiving converter of FIG. 5 to separate the signal from the noise and to retain a usable signal. For different types of channels, other types of discontinuities may exist, so that the receiver design parameters would differ, and, for example, different types of equalizer circuits to compensate for attenuation and delay distortion may be required.

It is not intended that this invention be limited in its application to any particular type of communications channel, nor to the particular type of circuits or parameters illustrated herein, and various modifications may be appropriate. For example, in place of the ramp and threshold circuits 168, 170, 172, 174, 176, 178 of FIG. 5, separate emitter follower circuits are used as an alternative, and they are respectively connected from the outputs of the phase splitter 166 and via separate capacitor coupling networks to drive directly the input diodes of flip-flop 182. Suitable operation is attained with this alternative.

Figure 6:
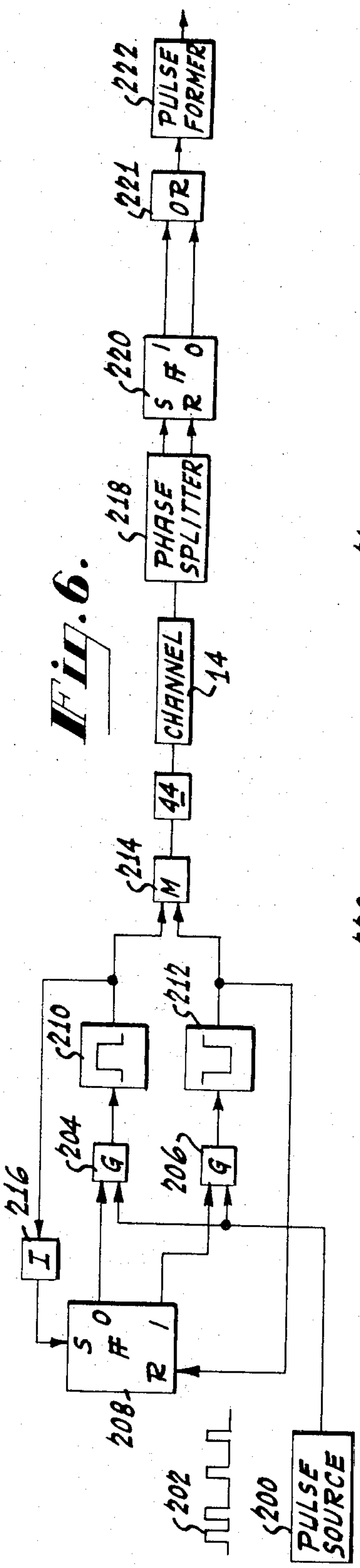
FIG. 6 is a schematic block diagram of another embodiment of this invention.

The embodiment of FIG. 6 is intended for use directly with a pulse source 200 that provides a train of pulses 202 and the absence of pulses that may be construed as representing binary digits 1 and 0, respectively. The pulses 202 are supplied to gates 204 and 206 that are opened and closed alternatively by the output levels of a flip-flop 208. Signal formers 210 and 212 respectively generate positive and negative pulses (i.e. signal half-cycles) in response to pulses passed by the associated gates 204 and 206, respectively. The outputs of the signal formers 210 and 212 are combined in a mixer 214 to provide a train of half-cycle signals alternating in polarity from a reference in a manner similar to that described above.

To provide alternation of pulses, the gates 204 and 206 are alternately opened to correspondingly steer successive pulses 202 to the positive and negative signal formers, respectively. This alternation is established by the outputs of the signal formers 212 and 210 being respectively fed back to the reset input and via an inverter 216 to the set input of flip-flop 208.

In operation, if the flip-flop 208 is initially reset, the first pulse is passed by gate 204 to generate a positive-going half-cycle via signal former 210, which half-cycle, upon its generation, sets the flip-flop 208 to open gate 206 for the succeeding pulse. Thereby, signal former 212 generates a negative pulse corresponding to the second binary input pulse, and this second pulse is effective to reset the flip-flop 208 and to open the gate 204 for the third pulse; and so on.

The receiving signal converter may simply include a full wave rectifier to restore the original pulses to a train of unidirectional pulses and thereby duplicate the original pulse train 202. Alternatively, in order to eliminate spurious pulses that may be generated within the channel 14, a phase splitter 218 and flip-flop 220 are provided in a manner similar to that described above in connection with FIG. 1. The outputs of flip-flop 220 provide transitions in voltage level with each pulse; and they are connected via a buffer 221 to a pulse former 222 (such as a one-shot multivibrator) that generates a positive-going pulse in response to each positive-going transition at either flip-flop output. The output of the pulse former 222 is a train of pulses and the absence of pulses corresponding to the original pulse train 202. The relationship of the transmitting and receiving flip-flops 208 and 220 is maintained over successive messages to eliminate "wrong" pulses.

Figure 9:
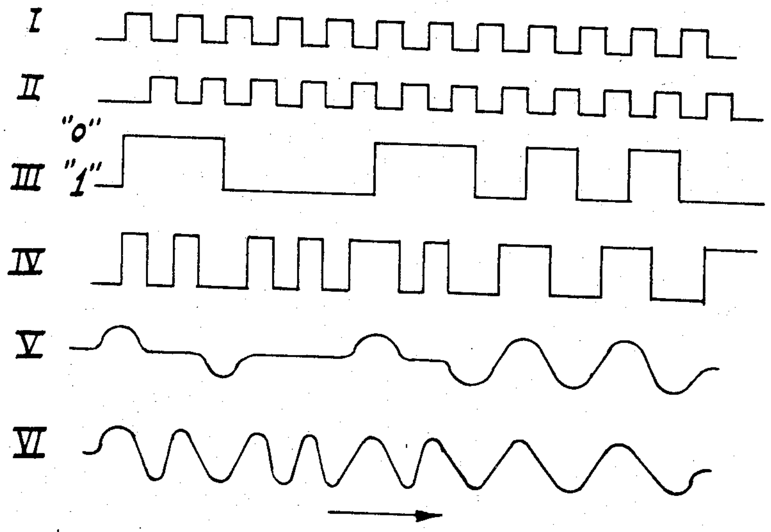
FIG. 9 is an idealized graphical diagram of the relative time occurrences and amplitude directions of waveforms occurring in the referenced parts of the embodiments of FIGS. 7 and 8 in a time sequence indicated by an arrow.
Figures 7, 8:
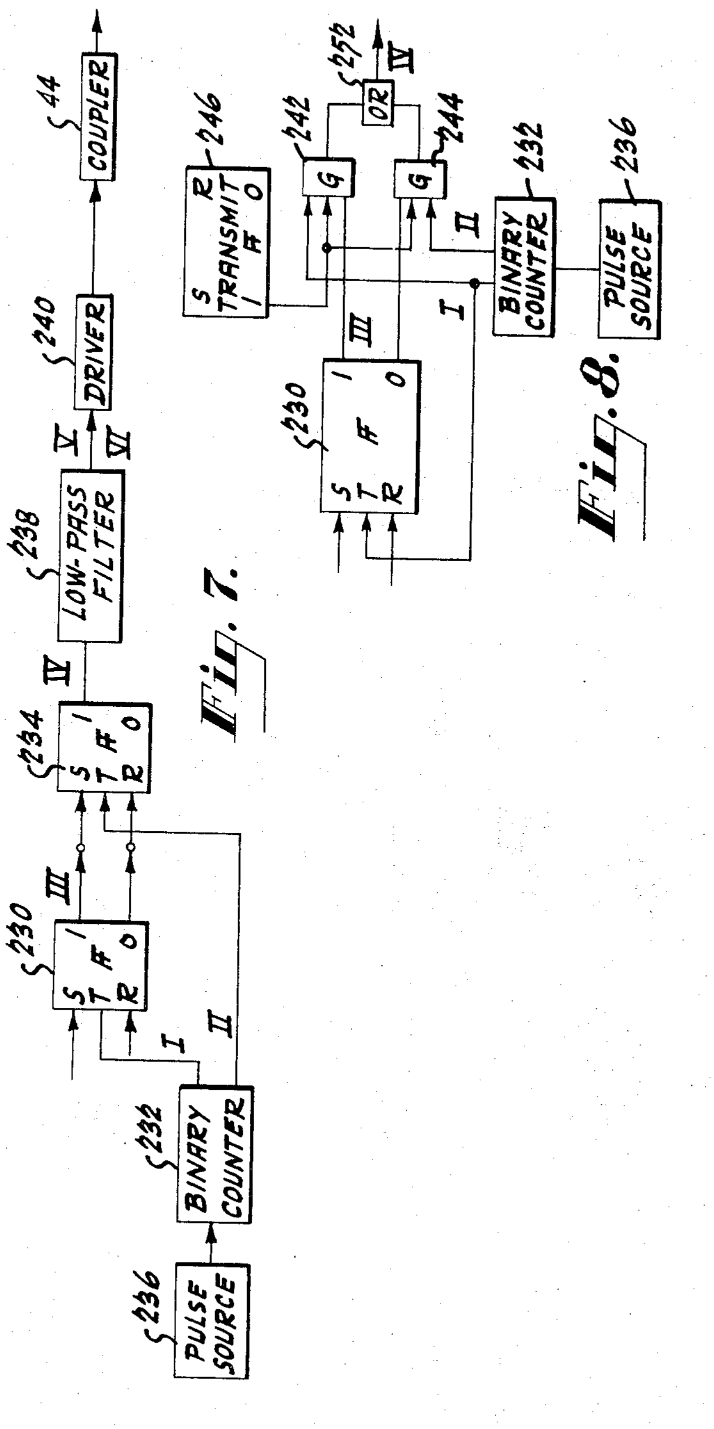
FIG. 7 is a schematic block diagram of still another embodiment of this invention.
FIG. 8 is a schematic block diagram of a modified form of the embodiment of FIG. 7.

In the embodiment of FIG. 7 the output of a source of binary signals is represented by a flip-flop 230 which may be the last stage of a shift register that is stepped by shift pulses (line I, FIG. 9). The shift pulses are supplied from a generator 232 at a regular rate no more than twice the maximum effective passband frequency of the channel 14. The outputs of the binary source 230 supply a waveform of varying signal levels (line III, FIG. 9), and they are respectively connected to the inputs of a flip-flop 234. The flip-flop 234 is of a different (complementing) type and is triggered to the opposite state whenever it is triggered by pulses from generator 232. The trigger pulses (line II, FIG. 9) are at the same repetition rate as the shift pulses and occur at the middle of each cycle thereof. The pulse generator 232 includes a binary counter stage that receives pulses at twice the shift pulse rate from a source 236 and supplies the required pulses on opposite outputs.

The output of the flip-flop 234 is applied to a low-pass filter 238 which rejects frequencies in excess of the maximum passband frequency of the communications channel 14 and applies the resultant signal to a driver amplifier 240 that drives the communications channel 14 via the line coupler 44.

The waveform output of the flip-flop 234 (line IV, FIG. 9) consists of successive pulse cycles (at the shift frequency, which may be greater than the maximum usable channel frequency) of 50% duty cycle for successive binary bits of the same type. Upon transitions to a binary bit of the opposite type, a half-cycle is produced of a wave whose frequency is within the channel passband and is one-half that of the shift pulse frequency; this waveform (line IV) is also a coherent one. The output waveform of the low pass filter (line V of FIG. 9) consists essentially only of the half-cycles of alternating polarity occurring on the transitions of the binary information to opposite binary digits, while the high frequency cycles corresponding to successive binary bits of the same type are filtered out. Accordingly, the resultant waveform applied to the communications channel is one of alternating positive and negative pulses from a reference level corresponding to transitions of the binary information to the opposite digits in a manner similar to that described above with respect to FIG. 1. The receiving signal converter may be of the same type as shown in FIG. 1 for redeveloping the original binary information from the transmitted waveform.

If desired, the filter 238 may be omitted and the effective filtering action of the communications channel utilized instead. In that case, the waveform received by the receiving signal converter is of the same type.

If the shift pulse frequency is within the passband of the communications channel (and within that of the filter 238, if one is used), the transmitted signal (line VI, FIG. 9) includes two frequencies. One frequency is of successive cycles at frequency $2f$ corresponding to successive bits of the same type, and the other of half-cycles of a half-frequency $f$ corresponding to transitions from one binary digit to the other. Since both frequencies are within the passband of the communications channel, the waveform transmitted to the receiving converter likewise includes those frequencies. This waveform (line VI) also includes half-cycles of alternating polarities from a reference and is a coherent one.

The receiving converter takes alternative forms. In one instance, it includes a low-pass filter to exclude the higher frequency and pass the lower frequency corresponding to the transitions. Thereafter, a phase splitter and flip-flop may be used in the manner described above to reconstruct the original binary information. Alternatively, the receiving signal converter includes a frequency shift keying detector for detecting the two frequencies with binary signals of one or the other type being successively generated in response to the $2f$ frequency signals, and with a shift in type of binary signal taking place upon occurrence of a half-cycle of the lower frequency signal.

In FIG. 8 a modification of the system of FIG. 7 is shown in which the information from the binary source 230 is supplied to a pair of gates 242 and 244 in opposite phase relation so as to enable one while disabling the other, or vice-versa, depending upon the binary bit being represented. The source 230 is timed by shift pulses (line I, FIG. 9) from generator 232. Both gates 242, 244 are enabled by an output signal from a control flip-flop 246 when transmitting, but this control may be dispensed with if the transmitting converter is to be operational at all times. In addition, both gates receive opposite-phase pulses (lines I and II, FIG. 9) from the generator 232.

The output pulses from the gates 242 and 244 of opposite phase are combined in a buffer (OR gate) 252. The output of gate 252 is the desired waveform (line IV, FIG. 9), and it is supplied to a low pass filter 238 and via a driver 240 and line coupler 44 to the communications channel 14 in a manner similar to that described in FIG. 7. The operation and transmitted waveforms vary depending on the relative frequencies of the shift pulses and channel passband as described above for FIG. 7.

In the embodiments of FIGS. 7 and 8 the pulse generator 232 synchronizes the transmitted signal rate, and the input binary information is necessarily supplied at the same rate, or at least available for transmission at that rate. However, in the system of FIG. 1, the rate of operation of the transmitting converter is determined by the source of signals to be transmitted, at least up to a maximum frequency limited by the passband of the communications channel. That is, in FIG. 1 the shift pulse generator 28 determines the time base of the transmitted signals, and the shift pulse generator 32 is synchronized to the received signals and operates at the same time base. Where the signals from the source are not supplied on a regular predetermined time sequence, the source nevertheless determines the times at which the signals are supplied. Where desired, the transmitting converters of the data sets in FIG. 1 may be provided with their own timing control and synchronization, and the receiving converter is operated on the same time base and synchronized to the signals received from the communications channel. Such a system may be desirable, for example, where the source of signals is a static memory and the readout of signals is under the control of the transmitting signal converter. The embodiment of FIG. 1 may be considered in those terms, with the shift pulse generator 28 being construed as part of the transmitting signal converter for reading out signals from the static register 20. Similarly, the pulse generator 32 may be construed as part of the receiving converter for controlling the storage of signals into the static register 22. Moreover, the register 20 may be construed as part of a transmitting converter which receives characters to be transmitted in parallel via inputs 23 and converts them by means of the pulse generator 28 to a serial train. The register 22 similarly reconverts the serial train of signals to a message of parallel signals established on output lines 25.

Various other modifications of the system and apparatus of this invention will be apparent to those skilled in the art. The foregoing embodiments of the invention are illustrative and are not intended to be limiting. The bistable device 54 and 220 of FIGS. 1 and 6 for eliminating "wrong" pulses may be any device that passes only successive half-cycles of alternating polarity and blocks a second half-cycle or pulse of the same polarity. For example, in FIG. 6, the phase splitter 218 and flip-flop 220 are replaceable by a magnetic core having a rectangular hysteresis loop and an input winding and two output windings. The core is driven to opposite states only by successive half-cycles of alternating polarity applied to the input winding and is essentially unaffected by "wrong" pulses. The output windings of opposite linkage are connected to the buffer 221 and provide the desired output pulses. In another modification, more than one signal half-cycle is generated for each binary information element (i.e. either a binary digit, or the transitions between the two digits), although a single signal half-cycle per element affords the optimum transmission rate. For example, three half-cycles per information element are generated by using three half-cycle generators for each of two signal formers. The first generator is triggered by a signal step, and its output of a first polarity triggers the second to produce an opposite polarity output which, in turn, triggers the third to produce a first polarity half-cycle. These three alternating half-cycles are combined in a mixer to supply the desired alternating signal combination. A second such signal former is utilized for opposite-going input signal steps and produces three alternating half-cycles starting with the second polarity. The outputs of the two signal formers are mixed and a reference level maintained between three half-cycle signals in the manner described above. In the receiver, "wrong" pulses are eliminated by means of a bistable magnetic core as described above, and the original signal levels are regenerated by counting the received alternating pulses and complementing a flip-flop upon each count of three. In the modifications of FIGS. 6, 7, and 8, duplex or half-duplex operation is provided by data sets having both a transmitting and a receiving converter in a manner similar to the data sets of FIG. 1.

Accordingly, a new and improved communications system and apparatus are provided which does not require the use of a carrier nor modulation thereof. Efficient transmission of digital data is achieved at frequencies limited only by the passband of the communications channel. The transmitted data rate corresponds to an equivalent binary information rate that can exceed up to about twice the maximum usable frequency of the channel (i.e. a frequency at which the channel "cuts off") or at which the attenuation is unsuitably high. The apparatus required for transmitting and receiving is relatively simple, and practical forms thereof are available. The transmitted half-cycles represent the original binary information elements by representing either one of the binary digits or the transitions between the two digits.

What is claimed is:

1. A digital communication system for transmitting binary information comprising transmitting and receiving means connected by a communication channel, said transmitting means including means for receiving two-level binary bit information having one level for one type of bits and another level for the opposite type of bits, in which the improvement comprises (a) means for converting said binary bits into respective substantially full-cycle signals whose periods are substantially equal to the binary bit period and of opposite phase for opposite types of bits, (b) whereby substantially half-cycle signals of bit period length are produced at transitions from one bit type to the other which are of opposite polarity for opposite transition directions, (c) means for transmitting said full-cycle and half-cycle signals to said receiving means, (d) and means at said receiving means for producing a two-level binary signal including means responsive to said half-cycle signals for producing different signal levels for opposite polarities of the half-cycle signals.

2. A system according to claim 1 in which said receiving means includes means for producing output binary bit signals at the bit frequency of the received signal, said means responsive to the half-cycle signals controlling the level of said output binary bit signals in accordance with the polarities of the half-cycle signals.

3. A system according to claim 1 in which said receiving means includes means for detecting said full-cycle and half-cycle signals and means responsive to said full-cycle signals for producing output binary bit signals at the bit frequency of the received signal, said means responsive to the half-cycle signals controlling the level of said output binary bit signals in accordance with the polarities of the half-cycle signals.

References Cited

UNITED STATES PATENTS

| | | | |
|---|---|---|---|
| 2,700,696 | 1/1955 | Barker | 178—26.5 |
| 2,759,047 | 8/1956 | Meacham | 328—164 |
| 2,996,578 | 8/1961 | Andrews | 178—164 |
| 3,050,587 | 8/1962 | Carbrey | 178—15 |
| 3,139,615 | 6/1964 | Aaron | 340—347 |
| 3,214,749 | 10/1965 | Karnaugh | 340—347 |

JOHN W. CALDWELL, *Acting Primary Examiner.*

ROBERT L. GRIFFIN, *Examiner.*